Sept. 3, 1946.   J. R. HARKNESS   2,407,076
FLUID-TIGHT RADIO SHIELDED JOINT
Filed Sept. 11, 1944
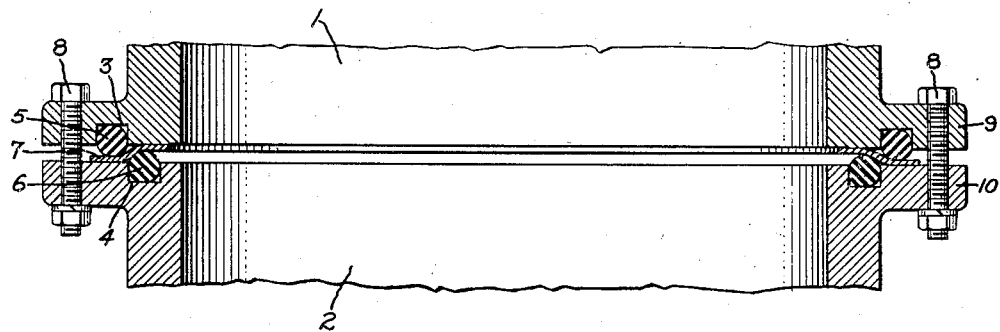
Inventor:
Joseph R. Harkness,
by Harry E. Dunham
His Attorney.

Patented Sept. 3, 1946

2,407,076

UNITED STATES PATENT OFFICE 2,407,076

FLUID-TIGHT RADIO SHIELDED JOINT

Joseph R. Harkness, Schenectady, N. Y., assignor to General Electric Company, a corporation of New York Application September 11, 1944, Serial No. 553,584

7 Claims. (Cl. 174—35)

My invention relates to fluid-tight radio shielded joints between two ignition system metallic members for providing good electrical contact between the two members at the joint and for preventing the escape of pressurizing fluid contained in the members.

An object of my invention is to provide an improved fluid-tight radio shielded joint.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing is a longitudinal sectional view through a pair of metallic members for an ignition system which is provided with an embodiment of my improved fluid-tight radio shielded joint construction.

In ignition systems, it is sometimes desirable to pressurize the interior of certain elements, and it is, therefore, necessary to provide a fluid-tight joint between the elements to prevent the loss of the pressurizing fluid. In addition, it is also desirable that a good electrical shield should be provided at the joint to prevent radio interference. In my improved construction, a fluid-tight radio shielded joint for the adjacent surfaces of two ignition system metallic members 1 and 2 is formed by the combination of resilient deformable fluid-sealing members and a deformable electrically conductive member. The two metallic members 1 and 2 are formed with peripherally extending grooves 3 and 4 which are offset from each other such that the groove 3 in one of the members is arranged on the outside of the groove 4 in the other member and is closely adjacent thereto. The inner edge of the groove 3 is arranged substantially over the outer edge of the groove 4, and resilient members 5 and 6 are arranged in the grooves 3 and 4 and extend completely around the periphery of the grooves and have a cross section such as to extend axially beyond the outer edges of the grooves 3 and 4. A deformable electrically conductive metallic washer 7, such as a piece of 0.01 inch thick aluminum in the form of a ring, which conforms generally to the peripheral contours of the combined grooves 3 and 4 and having a width sufficient to extend transversely over both of the resilient members 5 and 6 is arranged between these resilient members, and a plurality of bolts 8 extend through openings in flanges 9 and 10 in the members 1 and 2, respectively, for securing together these metallic members for biasing the resilient members 5 and 6 into intimate fluid-tight contact with the deformable metal washer 7 and for biasing opposite sides of the deformable washer into good electrical contact with the adjacent surfaces of the metallic members 1 and 2. Thus, the resilient members 5 and 6 form fluid-tight joints with the washer 7, and the washer 7 forms a good radio shield completely around the joint between the metallic members 1 and 2.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A fluid-tight radio shielded joint for adjacent surfaces of two metallic members each formed with a peripherally extending groove therein, a resilient member in each of said grooves extending axially beyond the outer edges of each of said grooves, a deformable electrically conductive washer arranged axially between and to extend transversely over both of said resilient members, and means for biasing said resilient members into intimate fluid-tight engagement with said deformable washer and for biasing the parts of the opposite sides of said deformable washer from each of said resilient members into good electrical contact with the adjacent surfaces of said metallic members.

2. A fluid tight radio shielded joint for adjacent surfaces of two metallic members each formed with a peripherally extending groove therein, a resilient member in each of said grooves extending completely around the periphery of said grooves and extending axially beyond the outer edges of each of said grooves, a deformable electrically conductive metallic washer arranged axially between and to extend transversely over both of said resilient members, and means for biasing said resilient members into intimate fluid-tight engagement with said deformable washer and for biasing opposite sides of said deformable washer into good electrical contact with the adjacent surfaces of said metallic members.

3. A fluid-tight radio shielded joint for adjacent surfaces of two metallic members each formed with a peripherally extending groove therein, a resilient member in each of said grooves extending completely around the periphery of said grooves and extending axially beyond the outer edges of each of said grooves, a deformable electrically conductive metallic washer having a width sufficient to extend transversely over both of said resilient members and arranged between said resilient members, and means for securing together said metallic members for biasing said resilient members into intimate fluid-tight engagement with said deformable washer and for biasing opposite sides of said deformable washer into good electrical contact with the adjacent surfaces of said metallic members.

4. A fluid-tight radio shielded joint for adjacent surfaces of two ignition system metallic members each formed with a peripherally extending groove therein, a resilient member in each of said grooves extending completely around the periphery of said grooves and extending axially beyond the outer edges of each of said grooves, a deformable electrically conductive metallic washer conforming generally to the peripheral contours of said grooves and having a width sufficient to extend transversely over both of said resilient members and arranged between said resilient members, and means for securing together said metallic members for biasing said resilient members into intimate fluid-tight engagement with said deformable washer and for biasing opposite sides of said deformable washer into good electrical contact with the adjacent surfaces of said metallic members.

5. A fluid-tight radio shielded joint for adjacent surfaces of two metallic members each formed with a peripherally extending groove therein, the groove in one of said members being offset towards the outside of the groove in the other of said members and arranged closely adjacent thereto, a resilient member in each of said grooves extending completely around the periphery of said grooves and extending axially beyond the outer edges of each of said grooves, a deformable electrically conductive metallic washer conforming generally to the peripheral contours of said grooves and arranged between and to extend transversely over both of said resilient members, and means for securing together said metallic members for biasing said resilient members into intimate fluid-tight engagement with said deformable washer and for biasing opposite sides of said deformable washer into good electrical contact with the adjacent surfaces of said metallic members.

6. A fluid-tight radio shielded joint for adjacent surfaces of two metallic members each formed with a peripherally extending groove therein, the groove in one of said members being offset towards the outside of the groove in the other of said members and arranged closely adjacent thereto, a resilient member in each of said grooves extending completely around the periphery of said grooves and extending axially beyond the adjacent surfaces of said metallic members, a deformable electrically conductive metallic washer conforming generally to the peripheral contours of said groove and having a width sufficient to extend transversely over both of said resilient members and arranged between said resilient members, and means for securing together said metallic members for biasing said resilient members into intimate fluid-tight engagement with said deformable washer and for biasing opposite sides of said resilient washer into good electrical contact with the adjacent surfaces of said metallic members.

7. A fluid-tight radio shielded joint for adjacent surfaces of two ignition system metallic members each formed with a peripherally extending groove therein, the groove in one of said members being offset towards the outside of the groove in the other of said members and arranged closely adjacent thereto, a resilient member in each of said grooves extending completely around the periphery of said metallic members and extending axially beyond the outer edges of each of said grooves, a deformable electrically conductive metallic washer conforming generally to the peripheral contours of said grooves and having a width sufficient to extend transversely over both of said resilient members and arranged between said resilient members, and means for securing together said metallic members for biasing said resilient members into intimate fluid-tight engagement with said deformable washer and for biasing opposite sides of said deformable washer into good electrical contact with the adjacent surfaces of said metallic members.

JOSEPH R. HARKNESS.